No. 622,691.  
J. F. HUGHES.  
HORSE BLINDING DEVICE.  
(Application filed June 16, 1898.)  
Patented Apr. 11, 1899.

(No Model.)

Witnesses  
Inventor  
James F. Hughes.

UNITED STATES PATENT OFFICE.

JAMES F. HUGHES, OF LONE GROVE, TEXAS.

HORSE BLINDING DEVICE.

SPECIFICATION forming part of Letters Patent No. 622,691, dated April 11, 1899.

Application filed June 16, 1898. Serial No. 683,569. (No model.)

*To all whom it may concern:*

Be it known that I, JAMES F. HUGHES, a citizen of the United States, residing at Lone Grove, in the county of Llano and State of Texas, have invented certain new and useful Improvements in Horse-Blinds; and I do declare the following to be a full, clear, and exact description of the invention, such as will enable others skilled in the art to which it appertains to make and use the same.

The invention has relation to horse-blinds; and the object is to provide a blind which may be pulled down in front of the eyes of the horse by a string within convenient reach of the driver for the purpose of stopping the animal should it attempt to run away or become frightened.

A further object is to provide a device of this character which will subserve, in addition to the above-assigned function, to act as an ordinary blind and also to shield the eyes and face of the horse from the rays of the sun, and, finally, to provide a device of this character which shall be simple in construction, durable in use, and comparatively inexpensive of production.

With these objects in view the invention consists in certain features of construction and combination of parts, which will be hereinafter fully described and claimed.

Figure 1:
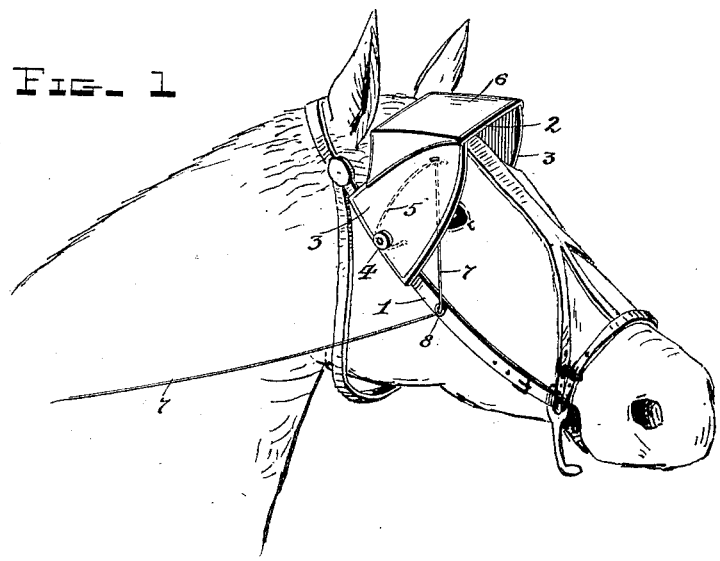
Figure 2:
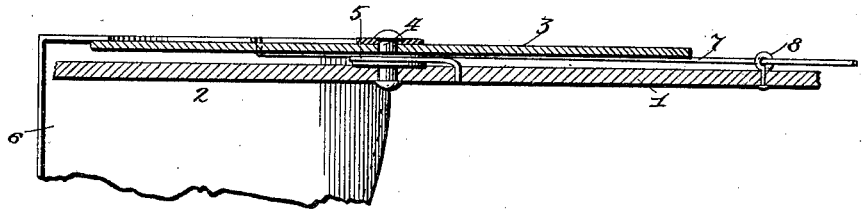

In the drawings, Figure 1 is a perspective view showing my invention applied. Fig. 2 is a cross-sectional view showing the manner of attaching the blind to the cheek-strap of the bridle.

In the drawings, 1 denotes the cheek-straps of the bridle, and 2 my improved blind. The blind consists of the side sections 3, of stiff material, which are or may be of the usual or well-known construction, only that the mode of attaching them to the cheek-piece is different. In the present case the side sections of the blind are connected by rivets 4 to the cheek-straps. Around one of these rivets is coiled a spring 5, one end of which is attached to one of the side sections of the blind and the other end to the cheek-strap to which the blind is pivoted, as more clearly shown in Fig. 2 of the drawings. The other side of the blind is likewise pivoted to its cheek-strap, but is not necessarily provided with a spring, though it may be, if desired. 6 denotes the hood-section of the blind, which may be made integral with the side sections or, as shown, have its ends secured to the upper edges of the side sections of the blinds, thus connecting the two side sections together and enabling me to use small or scrap pieces of leather in the construction of the device. This hood when retained in an elevated position by its spring will act as a guard or shade for the head of the animal and will materially lessen its discomfiture in warm sunny weather. 7 denotes an operating cord or wire, which is attached to one of the side sections of the blind and extends through a guide-eye 8 in one of the cheek-straps and then leads to the vehicle within convenient reach of its occupant.

Should for any cause the animal attempt to to run away, by drawing upon the string the hood-section of the blind will be lowered down in front of the animal's eyes and will cause it to stop. After the animal has been checked and the driver gains full control of it, by releasing the tension of the cord the spring will raise the hood up out of the way and free the obstruction of vision.

Having thus described the invention, what is claimed, and desired to be secured by Letters Patent, is—

The combination with the bridle, of a blind consisting of side sections and a top hood-section, the side sections pivoted to the bridle, a spring for holding the hood and side sections in normal positions above the eyes of the animal, and a cord leading to within convenient reach of the occupant of the vehicle, by means of which the hood-section and side sections of the blind may be drawn down, with the hood-section in front of the eyes of the animal, substantially as set forth.

In testimony whereof I have hereunto set my hand in presence of two subscribing witnesses.

JAMES F. HUGHES.

Witnesses:
  G. W. TEMPLETON,
  A. CROCKER.